(12) United States Patent
    Shaw

(10) Patent No.: US 9,302,618 B2
(45) Date of Patent: Apr. 5, 2016

(54) ACCESS AND EGRESS DETECTION SYSTEM FOR ASSIGNABLE LOCATIONS

(71) Applicant: Thomas J Shaw, Frisco, TX (US)

(72) Inventor: Thomas J Shaw, Frisco, TX (US)

(*) Notice: Subject to any disclaimer, the term of this patent is extended or adjusted under 35 U.S.C. 154(b) by 89 days.

(21) Appl. No.: 14/041,914

(22) Filed: Sep. 30, 2013

(65) Prior Publication Data

US 2014/0043155 A1    Feb. 13, 2014

Related U.S. Application Data

(63) Continuation-in-part of application No. 13/179,208, filed on Jul. 8, 2011, now abandoned.

(60) Provisional application No. 61/726,377, filed on Nov. 14, 2012.

(51) Int. Cl.
| | |
|---|---|
| *B60Q 1/00* | (2006.01) |
| *B60Q 9/00* | (2006.01) |
| *G08B 21/24* | (2006.01) |
| *B60N 2/00* | (2006.01) |
| *B60N 2/26* | (2006.01) |
| *G08B 21/22* | (2006.01) |

(52) U.S. Cl.
    CPC ...... *B60Q 9/00* (2013.01); *B60N 2/002* (2013.01); *B60N 2/26* (2013.01); *G08B 21/22* (2013.01); *G08B 21/24* (2013.01)

(58) Field of Classification Search
    CPC ........... B60N 2/002; B60N 2/26; B60N 2/28; B60Q 9/00; G08B 21/22; G08B 21/24; B60K 28/08; B60K 28/12; B60R 2025/1013; B60R 25/08; B60R 25/1001; B60R 25/1018; B60R 99/00; G06Q 30/00; G07C 2009/0009
    USPC ........ 340/457, 573.1, 573.4, 665, 545.4, 667, 340/425.5, 309.7, 686.1
    See application file for complete search history.

(56) References Cited

U.S. PATENT DOCUMENTS

| | | | |
|---|---|---|---|
| 2,785,551 | A | 9/1953 | Holzwarth et al. |
| 5,793,291 | A | 8/1998 | Thornton |
| 6,450,363 | B1 | 9/2002 | Lin |
| 6,480,103 | B1 | 11/2002 | McCarthy et al. |
| 6,922,147 | B1 | 7/2005 | Viksnins et al. |
| 6,924,735 | B2 * | 8/2005 | Ueda et al. ............... 340/426.28 |
| 6,930,614 | B2 * | 8/2005 | Rackham et al. .......... 340/686.1 |
| 7,218,211 | B2 * | 5/2007 | Ho et al. ....................... 340/457 |
| 7,218,218 | B1 | 5/2007 | Rogers |
| 7,348,880 | B2 | 3/2008 | Hules et al. |
| 7,378,979 | B2 * | 5/2008 | Rams, Jr. ...................... 340/667 |
| 7,663,493 | B2 * | 2/2010 | Monzo et al. .............. 340/573.1 |
| 8,044,782 | B2 | 10/2011 | Saban |

(Continued)

*Primary Examiner* — Daniel Previl
(74) *Attorney, Agent, or Firm* — Ross Barnes LLP; Monty L. Ross; Robin L. Barnes

(57) ABSTRACT

A child safety and alert system and method that detect and monitor access and egress for assignable locations within a motor vehicle by identifying designated positions within the vehicle, by monitoring at least one of the motor, the driver door and other doors or closures in the vehicle, by activating a timer if the motor is stopped or the driver door is opened and closed, and by triggering an alarm if the designated doors or closures are not opened within a predefined time interval after the motor stops or the driver door is opened. The alarm can be deactivated from the driver seat or by a remote device. The system and method are similarly useful for alerting a driver to retrieve objects from storage locations within a vehicle.

11 Claims, 1 Drawing Sheet

(56) References Cited

U.S. PATENT DOCUMENTS

| | | |
|---|---|---|
| 8,179,274 B2 | 5/2012 | Rork et al. |
| 8,284,041 B2 | 10/2012 | Cuddihy et al. |
| 8,610,569 B2 | 12/2013 | Lanta |
| 2003/0122662 A1* | 7/2003 | Quinonez .................... 340/457 |
| 2005/0099285 A1 | 5/2005 | Prevatt et al. |
| 2005/0225440 A1* | 10/2005 | Simmons et al. ............ 340/457 |
| 2007/0268119 A1* | 11/2007 | Cram ....................... B60Q 9/00 340/457 |
| 2008/0190948 A1 | 8/2008 | Sayasithsena |
| 2010/0302022 A1 | 12/2010 | Saban |
| 2011/0074565 A1* | 3/2011 | Cuddihy et al. ............. 340/457 |
| 2012/0050021 A1* | 3/2012 | Rao ....................... B60N 2/002 340/425.5 |

\* cited by examiner

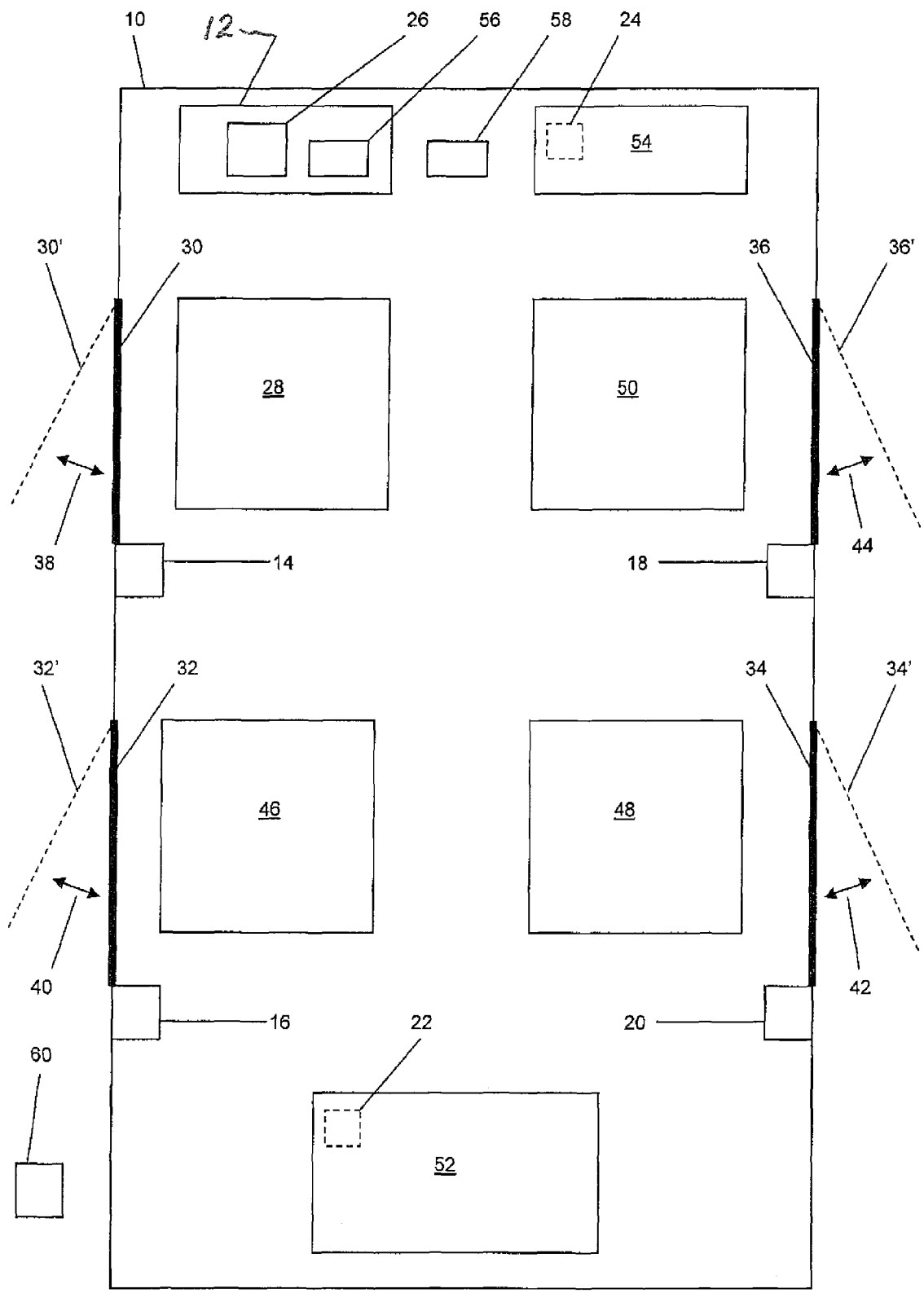

ACCESS AND EGRESS DETECTION SYSTEM FOR ASSIGNABLE LOCATIONS

CROSS-REFERENCE TO RELATED APPLICATION

This application claims the benefit under 35 U.S.C. 119(e) of provisional U.S. Application No. 61/726,377, filed Nov. 14, 2012, and is a continuation in part of U.S. application Ser. No. 13/179,208, filed Jul. 8, 2011, to the extent that it now includes disclosure from the 2012 provisional that was not present in U.S. application Ser. No. 13/179,208.

BACKGROUND OF THE INVENTION

1. Field of Invention

The present invention is directed to a safety warning system for motor vehicles, and more particularly, to a system and method that alert a driver when a child or an inanimate object of interest is left in the vehicle, generally but not always following movement of the vehicle from one point to another. The system detects and monitors access and egress for an assigned location within the motor vehicle. The system also optionally alerts a driver to remove a person or article from a motor vehicle when the vehicle engine is turned off.

2. Description of Related Art

In recent years the number of child deaths resulting from drivers having mistakenly or accidentally left their children inside closed motor vehicles has escalated to the point of causing widespread concern. Closed vehicles can quickly reach unsurvivable temperatures for infants or small children, either during summer in warmer climates or during winter in colder climates.

Various alarm and alert warning systems for children left in motor vehicles are described generally, for example, in U.S. Pat. Nos. 5,793,291; 6,922,147; 6,930,614; 7,218,211; 7,218,218; 7,348,880; 7,378,979; 7,663,493; U.S. 2003/0122662; and U.S. 2005/0099285. However, many such prior devices rely upon complex and expensive weight or pressure sensors that require modifications to motor vehicle seats and that attempt to differentiate between or perform differently for adult versus child passengers or inanimate objects such as children's car seats. Such conventional systems have typically been designed to function passively and without driver input, and do not allow a driver to affirmatively designate the location of a child or otherwise incapacitated passenger, or to designate the location of an object that should desirably be removed from the vehicle upon reaching a destination. Other conventional systems do not have the capability to assign monitored positions that may include, for example, vehicular storage locations such as trunks, glove boxes or consoles, where inanimate objects can be stored that a driver may want to be reminded to remove from a vehicle upon exiting the vehicle.

SUMMARY

The present invention is a child-alert warning system and method for motor vehicles that detects and monitors ingress and egress (for driver and passengers) and/or access to and retrieval from (for inanimate objects) assignable locations within a motor vehicle. Upon starting a motor vehicle, a driver is prompted, for example, to input the location of any child or object occupying a particular seat or storage location in the motor vehicle for which retrieval is required or desired upon reaching a destination. According to one embodiment, the system of the invention then monitors the driver's door to determine when it opens again after the location of a passenger or object to be retrieved has been identified. If monitoring sensors detect that the door, cover or lid associated with any driver-identified seat or storage position is not opened within a preset time interval after the driver's door is opened (i.e., after the driver has presumably exited the vehicle), an alarm sounds to alert the driver that a child or object previously designated for retrieval is possibly still inside the vehicle. The alarm can be deactivated or over-ridden by opening the door at the designated position or location, or from the driver's seat by the driver before exiting the vehicle, or by a remote device carried by the driver. If desired, the system can optionally be configured so that the previously designated vehicular positions remain designated for successive cycles of operation unless cleared or re-designated by the driver. Alternatively, the system can be configured to require a driver input even if the previously designated vehicular positions are to be retained without change for the next use of the vehicle.

According to another embodiment of the invention, a device and system are disclosed that will alert a driver to remove a person or article from a vehicle whenever the vehicle engine is turned off. Such a device and system can be configured to alert the driver following every use of the vehicle that requires starting the engine, or can be configured and controlled to operate either when selected by the driver or unless selectively de-activated by the driver.

It is believed that the system and method of the invention can be implemented relatively inexpensively in most motor vehicles by modifying existing on-board control and data systems as are now commonly used. Such systems, which typically provide information to the driver regarding vehicular status and operation, direction of travel, inside and outside temperature, etc., can be modified to query and receive input from the driver so as to allow the driver to identify particular seating and storage positions within the vehicle, to monitor opening and closing of the driver's door after particular vehicular seating and storage positions are identified, to initiate a timing sequence during which the door at each driver-designated position is monitored for opening and closing within a predetermined interval after the driver's door is subsequently opened, and to alert the driver and/or others if the door(s) to all driver-designated positions or locations are not opened within that interval.

The system and method disclosed herein are believed to differ from other known conventional child-alert systems in at least the following ways: Drivers can retain control over whether the previous designation of monitored locations is continued, modified or canceled; sensors inside passenger seats are not required; and the system can also be used to provide reminders regarding retrieval of persons or inanimate objects disposed in passenger seats, in floorboard locations proximal to passenger doors, or in other enclosed storage locations within a vehicle. As described above, the system and method of the invention can also be configured to alert a driver to remove a person or article from the vehicle when the engine is turned off following use of a vehicle. Such an alert based on engine operation can be controlled to operate independently of any ingress into or egress from the vehicle if desired.

BRIEF DESCRIPTION OF THE DRAWING

The apparatus of the invention is further described and explained in relation to the following drawing, which is a simplified diagrammatic view of the system of the invention as installed inside a motor vehicle.

DETAILED DESCRIPTION

As depicted in FIG. 1, one preferred embodiment of the present invention is a child-alert safety warning system that is based on access or ingress and egress detection for assignable locations in a motor vehicle. Motor vehicle 10, as depicted in simplified diagrammatic form, has an on-board digital processor or computer 12, a user interface such as a digital panel 26 that is linked to digital processor 12, a glove box 54, a trunk 52, a driver seat 28, a passenger seat 50, a first rear passenger seat 46, and a second rear passenger seat 48. Additionally, motor vehicle 10 has a driver door 30, a passenger door 36, a first rear passenger door 32, and a second rear passenger door 34. Installed in vehicle 10 are driver door sensor 14, passenger door sensor 18, first rear door sensor 16, second rear door sensor 20, trunk sensor 22, and glove box sensor 24. The system of the present invention also features a timer 56 or timing circuitry or software that can be integrated into the digital processor 12, an alarm 58, and a remote device 60, all of which are electronically linked to the digital processor 12. Although this embodiment of the invention is described in the context of a motor vehicle having four doors, a glove box and a trunk, it will be appreciated that the subject system is similarly effective when configured for use with the rear seat passenger doors only, or with the front passenger door only where the car is a model having only one or two doors, or no back seat.

According to a preferred method for operating the system of the invention, after vehicle 10 is started, a display panel associated with user interface 26 preferably displays a query statement asking the driver which passenger seats, if any, contain children or objects of interest. The driver inputs the information into the user interface 26 using any suitable technology, such as a touch-sensitive screen, other manual controls provided with the vehicle, voice commands, or the like, that are operatively linked to on-board digital processor or computer 12, thereby identifying one or more passenger seats as having, in this embodiment of the invention, a child occupant. Additionally, the driver's input in response to the initial query can indicate that an item has been placed in any of the previously discussed passenger positions or in another vehicle storage positions such as trunk 52 or glove box 54. On-board computer 12 then monitors openings and closings for driver door 30, other doors associated with other designated seat (or floorboard) locations, trunk 52, and glove box 54. Once the designated position has been input, the designated position(s) can remain designated until canceled by the driver or until new positions are designated by driver input.

The system of the invention can desirably trigger an alert within a predetermined interval when the vehicle engine is turned off following use, or after driver door 30 is opened, whether or not vehicle 10 has been moved. This can be significant if, for example, a driver places a child in a child safety seat installed in a passenger position of vehicle 10, but then exits the vehicle, possibly closing the door, to go back into a house, store, or the like, to do something before moving the car and is distracted and forgets that a child has been left inside the vehicle. Alternatively, if vehicle 10 has been placed in gear and is subsequently placed in "Park," on-board computer 12 monitors door openings and closings for driver door 30 and the other door(s) associated with the identified and designated seat positions. If driver door 30 opens, timer 56 or a similarly effective timing circuit is activated by on-board computer 12.

The subject system is preferably programmed to trigger an alert if any passenger door 32, 34, 36 or any door, lid or other closure providing access to any storage location 52, 54 that has been designated by the driver is not opened within a predetermined interval after driver door 30 is opened. If desired, sensors 14, 16, 18, 20 corresponding to each of doors 30, 32, 36 and 34, respectively, can be positioned, configured and calibrated to trigger an alarm only if such door has been opened to at least a predetermined distance of travel as indicated by arrows 38, 40, 44, 42 to the positions shown as 30', 32', 36' and 34', respectively. This would, for example, allow a driver or someone else who has inadvertently failed to completely close a door when loading vehicle 10 to again open and close a door without potentially triggering an alert. In most cases, however, it is believed that for safety purposes, any opening of any of driver door 30 or of any other driver-identified door should be sufficient to trigger the alarm sequence.

If each passenger door associated with a passenger seat that has been identified as being occupied by a child is not also opened within a predefined time interval after the driver's door closes, alarm 58 is activated to notify the driver and other nearby persons that an unattended child is possibly still inside the car. If any other door corresponding to a designated passenger seat, trunk 52 or glove box 54 has been identified as containing an item is not also opened within a predefined time interval, alarm 58 is activated to notify the driver that the door associated with such position, or the trunk 52 or glove box 54 might still contain an item.

The predefined time interval can comprise a preprogrammed default value that can be overridden manually, or can optionally be set on an ad hoc basis by the driver through the driver query prompt that initiates the cycle of operation of the system. The length of the predefined time interval can range from several seconds to several minutes or more. Alarm 58 can be an audible or visual alarm, or both, and if desired, can also be augmented by a programmable feature that will call one or more phones or send text or email messages upon activation. Alarm 58 can preferably be deactivated from driver seat 28 or by using remote device 60 such as, for example, an infrared or RF transmitter, predefined keystrokes on a cell phone, or the like.

Other alterations or modifications of the invention disclosed herein will likewise become apparent to those of ordinary skill in the art upon reading this disclosure, and it is intended that the scope of the invention be limited only by the broadest possible interpretation of the appended claims to which the inventor is legally entitled.

What is claimed is:

1. A driver-interactive child-alert warning system for a motor vehicle having a driver door and at least one passenger door, the system comprising:
    an on-board digital processor having a user interface proximal to the driver;
    a timer;
    an alarm;
    a driver door sensor proximal to the driver door; and
    at least one passenger door sensor proximal to the at least one passenger door;
    wherein the user interface is adapted to receive information input by a driver to confirm the placement of a child passenger in a seat associated with the at least one passenger door; and
    wherein, any subsequent opening of the driver door starts the timer and, after a predetermined interval, activates the alarm unless the at least one passenger door is also opened within the predetermined interval.

2. The system of claim 1, further comprising a sensor associated with a closure providing access to at least one storage area of the motor vehicle, wherein the user interface is adapted to receive information input by a driver to confirm the placement of an object in the storage area; and wherein any subsequent opening of the driver door starts the timer and, after a predetermined interval, activates the alarm unless the closure providing access to the at least one storage area of the motor vehicle is opened within the predetermined interval.

3. The system of claim 2 wherein the storage area is a trunk or glove box.

4. The system of claim 1 wherein the alarm can be deactivated before the driver exits the motor vehicle.

5. The system of claim 1, further comprising a device that can be used by the driver to deactivate the alarm remotely after exiting the motor vehicle.

6. The system of claim 1 wherein the digital processor does not allow the alarm to be activated until the motor vehicle has traveled a predetermined distance from a first location where the system is activated.

7. The system of claim 1 wherein the alarm is not activated until a sensor associated with the at least one passenger door sensor detects that the at least one passenger door passenger door has traveled a predetermined activation distance.

8. The system of claim 1 comprising sensors associated with at least two passenger doors.

9. The driver-interactive child-alert warning system of claim 1 wherein the alarm is configured to generate an audible alert, a visual alert, or both an audible and visual alert whenever an engine in the vehicle in which the system is installed is turned off following operation.

10. The driver-interactive child-alert warning system of claim 9 wherein the user interface comprises an electronic control unit through which the driver can provide input into the system regarding the timing and duration of the alerts generated by the alarm.

11. A driver-interactive retrieval alert system for a motor vehicle having at least one closed storage area and a closure providing access to the at least one closed storage area, the system comprising:

an on-board digital processor with a user interface;

a timer;

an alarm;

a driver door sensor proximal to the driver door; and at least one closure sensor proximal to the at least one closed storage area;

wherein the user interface is adapted to receive information input by a driver to confirm the placement of an object in the at least one closed storage area; and wherein, any subsequent opening of the driver door starts the timer and, after a predetermined interval, activates the alarm unless the closure is opened within the predetermined interval.

\* \* \* \* \*